3,410,851
DERIVATIVES OF FLAVONE
Dale Adrian Stauffer, Elkhart, Ind., assignor to Miles Laboratories, Inc., Elkhart, Ind., a corporation of Indiana
No Drawing. Continuation-in-part of application Ser. No. 306,342, Sept. 3, 1963. This application Sept. 25, 1967, Ser. No. 670,448
17 Claims. (Cl. 260—244)

ABSTRACT OF THE DISCLOSURE

A series of 3-substituted flavones in which the substituent is an aminomethyl radical of the formula

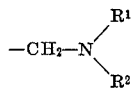

where $R^1$ and $R^2$ may each be hydrogen, lower alkyl, aralkyl, arylhydroxyalkyl or pyridyl and

may be a nitrogen heterocycle are useful as anti-convulsant, analgetic and bronchodilator agents.

---

This application is a continuation-in-part of copending application Ser. No. 306,324 filed Sept. 3, 1963, now abandoned.

This invention relates to novel derivatives of flavone. In one of its more particular aspects this invention relates to basic derivatives of flavone.

The compounds of this invention may be described by means of the structural formula

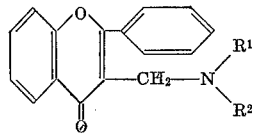

wherein the radical

represents a di-substituted amino radical which may be open chain or cyclic. Where this radical is an open chain radical, $R^1$ and $R^2$ may each be hydrogen, lower alkyl, aralkyl, arylhydroxyalkyl or pyridyl and may vary independently of one another, that is, $R^1$ and $R^2$ may be the same or different. Where the radical

is cyclic then $R^1$ and $R^2$ taken together with the adjacent nitrogen may be a nitrogen heterocycle, particularly a nitrogen monocyclic heterocyclic radical or a substituted derivative thereof. Of particular importance are the phenyl substituted nitrogen monocyclic heterocyclic radicals and those in which the substitution is with a pyridyl radical.

These compounds may exist in the form of their free bases as shown in the above formula or may be furnished as water soluble salts such as the hydrochloride or oxalate.

The compounds of this invention may be readily prepared, particularly by two convenient routes. In the first of these routes o-hydroxydibenzoylmethane is reacted with formaldehyde and an amine salt in a Mannich reaction to give the corresponding salt of the basic flavone derivative desired. This route is exemplified in Equation 1. Although the reaction conditions are not critical, it is preferred to heat the reactants under reflux and to add an excess of formaldehyde in order to assure complete reaction. The product, isolated as a salt corresponding to the amine salt used, may be converted to the free base or to various other salts by reaction with the appropriate acid.

Equation 1:

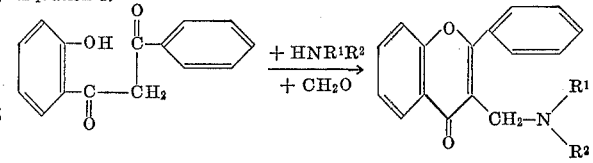

In another method of preparation of the compounds of this invention the appropriate amine is reacted with 3-chloromethylflavone in accordance with Equation 2.

Equation 2:

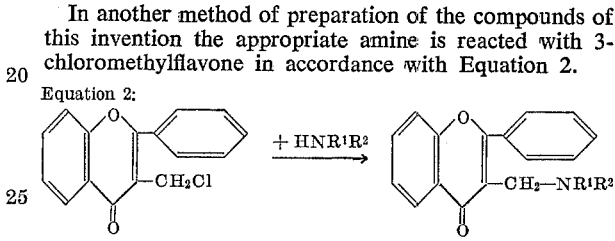

The basic flavone derivative may be recovered as the salt by using an appropriate acid. The product may also be isolated as the free base if desired.

The conditions of this reaction are not critical. It is necessary to heat the reaction mixture for varying times depending on the solvent used. The reaction may be conducted in the absence of a solvent by using an excess of the amine or in the presence of an appropriate solvent such as toluene or a lower aliphatic alcohol. In the latter case a base such as sodium carbonate is used to neutralize the acid formed in the reaction.

The compounds of this invention are useful as anti-convulsant analgetic and bronchodilator agents.

Medications may be prepared including the novel compounds of this invention as active ingredients in the form of free bases or pharmacologically acceptable acid addition salts. Water soluble, pharmacologically acceptable, acid addition salts of the active ingredient are preferred. Suitable medications may be formulated by combining at least one active ingredient with fillers, carriers, extenders and excipients generally used in pharmaceutical formulations. These medications are advantageously prepared in solid or liquid states as tablets, capsules, suspensions, solutions and similar dosage forms. The active ingredient may be mixed with common diluents or tableting adjuncts such as cellulose powder, cornstarch, lactose, talc, etc. according to accepted pharmaceutical manufacturing practices.

Medications including compounds of this invention as active ingredients may be effectively administered, intra-peritoneally, subcutaneously, or orally. For example, a medication including 3-dimethylaminomethylflavone hydrochloride in a saline solution was administered subcutaneously to a group of mice. The analgesic properties of this active ingredient were determined substantially according to the artery clip method as set forth by Bianchi, C. and Franceschini, J., Brit. J. Pharmacol. 9:280, 1954. An $ED_{50}$ dose (median effective analgesic dose) of 15.6 mg./kg. was observed.

In a similar manner, a medication including 3-(1-piperidylmethyl)-flavone hydrochloride in a saline solution was prepared and administered subcutaneously to a group of mice. The analgesic properties of this compound were determined according to the artery clip method previously described and an $ED_{50}$ dose of 47 mg./kg. was observed.

The specific medications described above were also used to determine an LD$_{50}$ does (dose at which death occurs to 50% of animals treated). The medications were administered intraperitoneally to a group of mice in varying doses. An LD$_{50}$ dose of 68.1 mg./kg. was observed for 3-dimethylaminomethylflavone hydrochloride and an LD$_{50}$ dose of 147 mg./kg. was observed for 3-(1-piperidylmethyl)flavone.

Although the hydrochloride form of these active ingredients were used to determine ED$_{50}$ and LD$_{50}$, it will be understood by one skilled in the art that other addition salts or the free base forms could also be used. Also, a person skilled in the art will recognize that other active ingredients could be utilized in dosages of similar magnitude.

The invention will be better understood by reference to the following examples which are intended for purposes of illustration and are not to be construed as unduly limiting the invention except as the invention may be described in the claims appended hereto.

EXAMPLE 1

(A) 3-dimethylaminomethylflavone

A mixture of o-hydroxydibenzoylmethane (24.0 g., 0.1 mole), dimethylamine hydrochloride (9.0 g., 0.11 mole), 95% paraformaldehyde (4.7 g., 0.15 mole), 25 ml. of 2-propanol and 5 drops of concentrated hydrochloric acid was heated under reflux for one (1) hour. Another 2.4 g. of paraformaldehyde was rinsed into the clear solution with 10 ml. of 2-propanol, and the heating was continued for two (2) hours longer. The solvent was removed from the clear solution by distillation under reduced pressure. The syrup residue was shaken with 100 ml. of ether and 200 ml. of water to which 10 ml. concentrated hydrochloric acid had been added. The aqueous layer was separated and treated with excess potassium carbonate. The free base was collected, washed with water and recrystallized from aqueous ethanol. The beige colored crystals (15.5 g., 56%) melted at 107°–108°.

*Analysis.*—Calcd. for $C_{18}H_{17}NO_2$: N(basic), 5.02; N(total), 5.02. Found: N(basic), 4.90; N(total), 5.11.

(B) 3-dimethylaminomethylflavone hydrochloride

The free base (14.5 g.) was dissolved in a little warm 2-propanol, and excess 2-propanolic hydrogen chloride was added. The warm solution was diluted to incipent turbidity with dry ether. The white crystals were collected and washed with anhydrous ether. The salt (15.5 g., 95%) melted at 208°–209°.

*Analysis.*—Calcd. for $C_{18}H_{18}ClNO_2$: HCl, 11.55; N(basic), 4.44; N(total), 4.44. Found: HCl, 11.61; N(basic), 4.35; N(total), 4.41.

EXAMPLE 2

(A) 3-(4-morpholinylmethyl)flavone

The procedure of Example 1 was carried out using morpholine hydrochloride as the amine. The product was isolated in a yield of 52% and was found to have a melting point of 167°–168°.

*Analysis.*—Calcd. for $C_{20}H_{19}NO_2$: N(basic), 4.36; N(total), 4.36. Found: N(basic), 4.35; N(total), 4.35.

(B) 3-(4-morpholinylmethyl)flavone hydrochloride

The procedure of Example 1 was carried out to convert the free base to the hydrochloride. The yield of hydrochloride was quantitative with the hydrochloride having a melting point 242°–243°.

*Analysis.*—Calcd. for $C_{20}H_{20}ClNO_3$: HCl, 10.19; N(basic), 3.90; N(total), 3.90. Found: HCl, 10.17; N(basic), 3.87; N(total), 3.89.

EXAMPLE 3

(A) 3-(1-piperidylmethyl)flavone

The procedure of Example 1 was carried out as above using piperidine hydrochloride. The product was isolated in a yield of 38% with a melting point of 144°–145°.

*Analysis.*—Calcd. for $C_{21}H_{21}NO_2$: N(basic), 4.39; N(total), 4.39. Found: N(basic), 4.37; N(total), 4.45.

(B) 3-(1-piperidylmethyl)flavone hydrochloride

This product was prepared from the free base as in Example 1 in a yield of 95%. The salt was found to have a melting point of 200°–201°.

*Analysis.*—Calcd. for $C_{21}H_{22}ClNO_2$: HCl, 10.25; N(basic), 3.94; N(total), 3.94. Found: HCl, 10.25; N(basic), 3.87; N(total), 3.93.

EXAMPLE 4

3-(4-hydroxy-4-phenyl-1-piperidylmethyl)flavone hydrochloride

This product was prepared in accordance with the procedure of Example 1 in a yield of 37% using 4-hydroxy-4-phenyl piperidine hydrochloride. The product had a melting point of 252°–253°. (decomp.).

*Analysis.*—Calcd. for $C_{27}H_{26}ClNO_3$: HCl, 8.14; N(basic), 3.13; N(total), 3.13. Found: HCl, 8.01; N(basic), 3.07; N(total), 3.10.

EXAMPLE 5

(A) 3-(1-hexamethyleneiminomethyl)flavone

The procedure of Example 1 was carried out as above using hexamethyleneimin hydrochloride. The product was isolated in a yield of 28% with a melting point of 132°–133°.

*Analysis.*—Calcd. for $C_{22}H_{23}NO_2$: N(basic), 4.20; N(total), 4.20. Found: N(basic), 4.16; N(total), 4.21.

(B) 3-(1-hexamethyleneiminomethyl)flavone hydrochloride

This product was prepared from the free base as in Example 1 in a yield of 88%. The salt was found to have a melting point of 197°–198°.

*Analysis.*—Calcd. for $C_{22}H_{24}ClNO_2$: HCl, 9.86; N(basic), 3.79; N(total), 3.79. Found: HCl, 9.79; N(basic), 3.71; N(total), 3.74.

EXAMPLE 6

(A) 3-(6-methyl-6-phenyltetrahydro-1,3-oxazin-3-ylmethyl)flavone

The procedure of Example 1 was carried out as above using 6-methyl-6-phenyltetrahydro-1,3-oxazin hydrochloride. The product was isolated in a yield of 50% with a melting point of 147°–148°.

*Analysis.*—Calcd. for $C_{27}H_{27}NO_3$: N(basic), 3.40; N(total), 3.40. Found: N(basic), 3.44; N(total), 3.48.

(B) 3-(6-methyl-6-phenyltetrahydro-1,3-oxazin-3-ylmethyl)flavone hydrochloride.

This product was prepared from the free base as in Example 1 in a yield of 82%. The product had a melting point of 202°–203°. (decomp.).

*Analysis.*—Calcd. for $C_{27}H_{26}ClNO_3$: HCl, 8.14; N(basic), 3.13; N(total), 3.13. Found: HCl, 8.18; N(basic), 3.18; N(total), 3.10.

EXAMPLE 7

(A) 3-[4-(2-pyridyl)-1-piperazinylmethyl]flavone

The procedure of Example 1 was carried out as above described using 4-(2-pyridyl)piperazine hydrochloride. The product was isolated in a yield of 46% with a melting point of 134°–135°.

*Analysis.*—Calcd. for $C_{25}H_{23}N_3O_2$: N(basic), 7.05; N(total), 10.57. Found: N(basic), 7.00; N(total), 10.76.

(B) 3-[4-(2-pyridyl)-1-piperazinylmethyl]flavone dihydrochloride

This product was prepared from the free base as in Example 1 in a yield of 97%. The salt was found to have a melting point of 255°–256°. (decomp.).

*Analysis.*—Calcd. for $C_{25}H_{25}Cl_2N_3O_2$: HCl, 15.30; N(basic) (2), 5.96; N(total), 8.93. Found: HCl, 15.32; N(basic), 5.89; N(total), 8.95.

EXAMPLE 8

3-methylaminomethylflavone hydrochloride

This product was prepared in accordance with the procedure of Example 1 in a yield of 22% using methylamine hydrochloride. The product had a melting point of 244°–245° (decomp.).

*Analysis.* — Calcd. for $C_{17}H_{16}ClNO_2$: HCl, 12.08; N(basic), 4.64; N(total), 4.64. Found: HCl, 12.07; N(basic), 4.58; N(total), 4.54.

EXAMPLE 9

3-(4-morpholinylmethyl)flavone 3-chloromethylflavone (7.6 g., 0.028 mole) was mixed with 19.6 g. (0.112 mole) of morpholine. After the heat of the initial spontaneous exothermic reaction had dissipated the mixture was warmed gently. The solid material disappeared, and two liquid layers formed. After heating under gentle reflux for five (5) minutes the mixture was cooled in an ice bath. The solid residue was mixed with water, and an excess of hydrochloric acid was added. The solution was clarified with Nuchar C–1000–N, and excess potassium carbonate was added. The solid free base was collected, washed with water and recrystallized from aqueous ethanol. The white needles (8.1 g., 90%) melted at 167°–168°.

This is the same compound as in Example 2 above.

EXAMPLE 10

(A) 3-(4-phenyl-1-piperazinylmethyl)flavone

A mixture of 3 - chloromethylflavone (13.5 g., 0.05 mole), phenylpiperazine (16.2 g., 0.1 mole) and 50 ml. of toluene was heated under reflux for thirty (30) minutes. The mixture, which contained much undissolved solid material, was cooled and diluted with 200 ml. of ether. Then 300 ml. of water and an excess of hydrochloric acid was added. The mixture was shaken in a separatory funnel, and the aqueous portion was withdrawn along with much undissolved syrupy material. The aqueous mixture was diluted to 500 ml. with water and warmed until a clear solution formed. The solution was cooled, and some of the syrupy salt separated out again. The mixture was treated with an excess of potassium carbonate. The solid free base collected, washed with water and recrytsallized from aqueous ethanol. The hot solution was clarified with Nuchar C–1000–N. The beige colored crystals (15.8 g., 80%) melted at 148°–149°.

*Analysis.*—Calcd. for $C_{26}H_{24}N_2O_2$: N(basic) (1), 3.54; N(total), 7.07. Found: N(basic), 3.60; N(total), 7.15.

(B) 3-(4-phenyl-1-piperazinylmethyl)flavone hydrochloride

The free base (15.3 g., 0.0386 mole) was mixed with a little 2-propanol, and 24.7 ml. of 1.566 N 2-propanolic hydrogen chloride was added. This is the theoretical quantity of acid required to form the hydrochloride salt. The mixture was concentrated by evaporation and diluted with hot ethyl acetate. The beige colored crystals which formed on cooling were collected, washed with ethyl acetate and dried. The product (13.2 g., 79%) melted at 201°–202° (decomp.).

*Analysis.* — Calcd. for $C_{26}H_{25}ClN_2O_2$: HCl, 8.42; N(basic) 6.47; N(total), 6.47. Found: HCl, 8.43; N(basic), 6.47; N(total), 6.42.

EXAMPLE 11

(A) 3-[4-(3-chlorophenyl)-1-piperazinylmethyl]flavone

The procedure of Example 10 was carried out using m-chlorophenylpiperazine. The product was isolated in a yield of 52% with a melting point of 155°–156°.

*Analysis.*—Calcd. for $C_{26}H_{23}ClN_2O_2$: N(basic) (1), 3.25; N(total), 6.50. Found: N(basic), 3.26; N(total), 6.68.

(B) 3-[4-(3-chlorophenyl)-1-piperazinylmethyl]flavone oxalate

The oxalate was prepared as in Example 10 above using oxalic acid instead of hydrochloric acid. The salt was isolated in a yield of 88% with a melting point of 174°–175°. (decomp.).

*Analysis.* — Calcd. for $C_{28}H_{25}ClN_2O_6$: N.E., 260.5; N(basic), 2.69; N(total), 5.38. Found: N.E., 263.2; N(basic), 2.62; N(total), 5.41.

EXAMPLE 12

(A) N-(2-pyridyl)-N-(2-hydroxy-2-phenylethyl)-3-aminomethylflavone

The procedure of Example 10 was carried out using N-(2 - pyridyl)-β-hydroxyphenethylamine. The product was isolated in a yield of 12% with a melting point of 137°–138°.

*Analysis.*—Calcd. for $C_{29}H_{24}N_2O_3$: N(basic) (1), 3.12. Found: N(basic), 3.14.

(B) N-(2-pyridyl)-N-(2-hydroxy-2-phenylethyl)-3-aminomethylflavone hydrochloride This product was prepared from the free base as in Example 10 in a yield of 95%. The salt was found to have a melting point of 192°–193°.

*Analysis.* — Calcd. for $C_{29}H_{25}ClN_2O_3$: HCl, 7.52; N(basic) (1), 2.89; N(total), 5.78. Found: HCl, 7.46; N(basic), 2.95; N(total), 5.77.

EXAMPLE 13

(A) 3-diethylaminomethylflavone

The procedure of Example 10 was carried out using diethylamine. The product was isolated in a yield of 92% with a melting point of 84°–85°.

*Analysis.* — Calcd. for $C_{20}H_{21}NO_2$: N(basic), 4.56; N(total), 4.56. Found: N(basic), 4.62; N(total), 4.59.

(B) 3-diethylaminomethylflavone hydrochloride

This product was prepared from the free base as in Example 10 in a yield of 90%. The salt was found to have a melting point of 201°–202°.

*Analysis.*—Calcd. for $C_{20}H_{22}ClNO_2$: HCl, 10.60; N(basic), 4.07; N(total), 4.07. Found: HCl, 10.68; N(basic), 4.20; N(total), 4.13.

EXAMPLE 14

3-benzylaminomethylflavone hydrochloride

This product was prepared in accordance with the procedure of Example 10 in a yield of 61% using benzylamine. The product had a melting point of 245°–246°.

*Analysis.*—Calcd. for $C_{23}H_{20}ClNO_2$: HCl, 9.65; N(basic), 3.71; N(total), 3.71. Found: HCl, 9.60; N(basic), 3.68; N(total), 3.71.

EXAMPLE 15

3-(n-butylaminomethyl)flavone hydrochloride

This product was prepared in accordance with the procedure of Example 10 in a yield of 27% using n-butylamine. The product had a melting point of 243°–244°.

*Analysis.*—Calcd. for $C_{20}H_{22}ClNO_2$: HCl, 10.61; N(basic), 4.07; N(total), 4.07. Found: HCl, 10.67; N(basic), 4.06; N(total), 4.07.

EXAMPLE 16

3-[4-(3-chlorophenyl)-1-piperazinylmethyl]flavone

A mixture of 3-chloromethylflavone (13.5 g., 0.05 mole), 1-(3-chlorophenyl)piperazine (9.8 g., 0.05 mole), sodium carbonate (5.3 g., 0.05 mole) and 50 ml. of 95% ethanol was heated under reflux for two (2) hours. The mixture was diluted with water, and an excess of hydrochloric acid was added. A small quantity of undissolved solid material was removed by filtration, and excess potassium carbonate was added. The solid free base was collected, washed with water and recrystallized from aqueous ethanol. The almost white crystals (14.4 g., 67%) melted at 155°–156°.

This is the same compound as in Example 11 above.

EXAMPLE 17

N-(2-pyridyl)-N-(2-hydroxy-2-phenylethyl)-3-aminomethylflavone

This compound was prepared in accordance with the method of Example 16 using N - (2-pyridyl)-β-hydroxyphenethylamine. The product was isolated in a yield of 15% with a melting point of 137°–138°.

This compound is the same as in Example 12 above.

In summary, this invention provides a series of novel flavone derivatives which are useful as anti-convulsant, analgetic and bronchodilator agents.

What is claimed is:

1. A compound selected from the group consisting of compounds of the formula

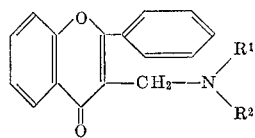

wherein $R^1$ and $R^2$ each independently is a member selected from the group consisting of hydrogen, lower alkyl, phenyl lower alkyl, phenyl hydroxy lower allkyl and pyridyl, and $R^1$ and $R^2$ taken together with nitrogen in the radical

is a member selected from the group consisting of 4-hydroxy-4-phenyl-1-piperidyl, 6-methyl - 6-phenyltetrahydro-1,3-oxazin-3-yl, 1-hexamethyleneimino, 4-(2-pyridyl)-1-piperazinyl, 1-piperidyl, 4-phenyl - 1-piperazinyl, 4-(3-chlorophenyl)-1-piperazinyl, 4-morpholinyl, and pharmacologically acceptable salts thereof.

2. A compound according to claim 1 which is 3-dimethylamino-methylflavone.

3. A compound according to claim 1 which is 3-(4-hydroxy-4-phenyl-1-piperidylmethyl)flavone.

4. A compound according to claim 1 which is 3-(6-methyl-6 - phenyltetrahydro - 1,3-oxazin - 3 - ylmethyl)-flavone.

5. A compound according to claim 1 which is 3-(1-hexamethyleneiminomethyl)flavone.

6. A compound according to claim 1 which is 3-[4-(2-pyridyl)-1-piperazinylmethyl]flavone.

7. A compound according to claim 1 which is 3-(1-piperidylmethyl)flavone.

8. A compound according to claim 1 which is 3-(4-phenyl-1-piperazinylmethyl)flavone.

9. A compound according to claim 1 which is 3-[4-(3-chlorophenyl)-1-piperazinylmethyl]flavone.

10. A compound according to claim 1 which is N-(2-pyridyl) - N-(2-hydroxy-2-phenylethyl)-3-aminomethylflavone.

11. A compound according to claim 1 which is 3-benzylaminomethylflavone.

12. A compound according to claim 1 which is 3-(4-morpholinylmethyl)flavone.

13. A compound according to claim 1 which is 3-diethylaminomethylflavone.

14. A compound according to claim 1 which is 3-(n-butylaminomethyl)flavone.

15. A compound according to claim 1 which is 3-methylaminomethylflavone.

16. A process for the preparation of a compound of claim 1 of the formula

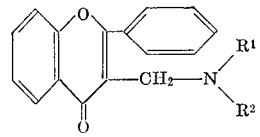

wherein $R^1$ and $R^2$ each independently is a member selected from the group consisting of hydrogen, lower alkyl, phenyl lower alkyl, phenyl hydroxy lower alkyl and pyridyl, and $R^1$ and $R^2$ taken together with nitrogen in the radical

is a member selected from the group consisting of 4-hydroxy-4-phenyl-1-piperidyl, 6-methyl - 6-phenyltetrahydro-1,3 - oxazin-3-yl, 1 - hexamethyleneimino, 4-(2-pyridyl) - 1-piperazinyl, 1 - piperidyl, 4-phenyl-1-piperazinyl, 4 - (3-chlorophenyl)-1-piperazinyl, 4-morpholinyl, which comprises reacting o-hydroxydibenzoylmethane with formaldehyde and a salt of a secondary amine of the formula

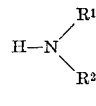

wherein $R^1$, $R^2$ and

each has the same significance as above.

17. A process for the preparation of a compound of claim 1 of the formula

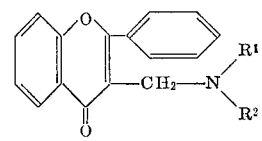

wherein $R^1$ and $R^2$ each independently is a member selected from the group consisting of hydrogen, lower alkyl, phenyl lower alkyl, phenyl hydroxy lower alkyl and pyridyl, and $R^1$ and $R^2$ taken together with nitrogen in the radical

is a member selected from the group consisting of 4-hydroxy-4-phenyl - 1-piperidyl, 6-methyl - 6-phenyltetrahydro-1,3-oxazin-3-yl, 1-hexamethyleneimino, 4-(2-pyridyl)-1-piperazinyl, 1-piperidyl, 4-phenyl - 1 - piperazinyl, 4-(3-chlorophenyl)-1-piperazinyl, 4-morpholinyl, which comprises reacting 3-cholormethylflavone with a secondary amine of the formula

wherein R¹, R² and
each has the same significance as above.
References Cited
Wiley: "J. Am. Chem. Soc.," vol. 74, pp. 4326–8 (1952).
HENRY R. JILES, *Primary Examiner.*
R. T. BOND, *Assistant Examiner.*